United States Patent [19]
Pauler et al.

[11] Patent Number: 5,642,889
[45] Date of Patent: Jul. 1, 1997

[54] SEALING RING

[75] Inventors: Franz Pauler, Laudenbach; Ulrich Dahlhaus, Edingen-Neckarhausen; Rolf Vogt, Oftersheim, all of Germany

[73] Assignee: Firma Carl Freudenberg, Germany

[21] Appl. No.: 612,642

[22] Filed: Mar. 8, 1996

[30] Foreign Application Priority Data

Mar. 17, 1995 [DE] Germany .................. 19 509 771.8

[51] Int. Cl.$^6$ ............................................. F16J 15/32
[52] U.S. Cl. ..................... 277/37; 277/153; 277/215; 277/152
[58] Field of Search ..................... 277/37, 153, 215, 277/152

[56] References Cited

U.S. PATENT DOCUMENTS

| | | | |
|---|---|---|---|
| 3,021,161 | 2/1962 | Rhoads et al. | 277/37 |
| 4,643,436 | 2/1987 | Jackowski | 277/153 |
| 4,867,926 | 9/1989 | Matsushima | 277/153 |
| 5,127,661 | 7/1992 | Franson et al. | 277/215 |

*Primary Examiner*—William A. Cuchlinski, Jr.
*Assistant Examiner*—Christina Annick
*Attorney, Agent, or Firm*—Kenyon & Kenyon

[57] ABSTRACT

A sealing ring inserted into the radial space between two relatively movable cylindrical surfaces of a first and a second machine part. The cylindrical surfaces surround one another coaxially, and the sealing ring includes a first device for statically stationary fixing and sealing of the first machine part, as well as a second device for movable sealing of the second machine part. The first device is formed by a retaining ring made of a polymeric material pierced by at least one relief groove and engaging the first machine part, as well as an annular lip seal situated in front of the relief groove which is acted upon by the pressure of the medium to be sealed. The lip seal elastically deforms above a preselected minimum pressure differential and disengages from the first machine part. The lip seal, under radial prestressing, is in contact with the first cylindrical surface during normal use of the sealing ring and elastically deforms in the radial direction only when the minimum pressure differential is exceeded.

9 Claims, 4 Drawing Sheets

SEALING RING

BACKGROUND OF THE INVENTION

1. Field Of The Invention

The present invention relates to a sealing ring inserted into the radial space between two relatively movable cylindrical surfaces of a first and a second machine part, in which the cylindrical surfaces surround one another coaxially. The invention includes a first element statically fixing and sealing the first machine part, and a second element for dynamically sealing the second machine part. The first element is formed by a retaining ring made of a polymeric material pierced by a relief groove and engaging the first machine part. The first element also includes an annular-shaped lip seal situated in front of the relief groove which is acted upon by the pressure of the medium to be sealed and elastically deforms in response to a pressure differential above a preselected minimum to disengage from the first machine part.

2. Description Of The Prior Art

A sealing ring is shown in German Patent No. 32 44 209. That sealing ring is designed as a doctor seal element and has a sealing body having two doctoring lips spaced axially from one another. The sealing ring has at least one sealing part projecting outwardly from the sealing body transversely to the axis of the sealing ring which abuts sealingly, and under prestressing, against an axially adjoining counter-sealing surface. The sealing ring is designed to be used as a secondary sealing device and is arranged on the side of a primary sealing device facing away from the medium to be sealed. During normal use, the annular space which is between the primary and the secondary sealing devices can gradually fill up with the medium to be sealed, for example oil, leading to a pressure build-up in this space. The objective which underlies the sealing ring of German Patent No. 32 44 209 is to construct the sealing ring in such a way that the sealing device is prevented from being forced out due to high pressure, while forgoing relief boreholes in the hydraulic cylinder. In the event of rising oil pressure, the oil present in the annular space between the primary sealing device and the sealing ring is released, by a relief groove past a lip seal, to the surroundings in order. This oil release indicates that the primary sealing device is defective and therefore should be replaced. Because, under excessive pressure, the oil escapes through the relief groove in the direction of the surroundings, impurities are intended to be prevented from penetrating into the space to be sealed.

SUMMARY OF THE INVENTION

The problem which the present invention seeks to solve is to provide a sealing ring for installation in non-vented assemblies such as, for example, axles and gears. A further object of the invention is to allow longer storage of the non-vented assemblies while preventing leakage and/or the loss of viscosity of the lubricant.

To achieve the objectives of the present invention, the lip seal is in contact, under a radial prestressing, with the first cylindrical surface and elastically deforms in the radial direction only when a minimum pressure differential is exceeded. The present invention can be used to ventilate (i.e., increase pressure within) or to vent (i.e., decrease pressure within) the space to be sealed by the sealing ring. In the case of the assembly of gears and axles, pressure frequently builds up within the space to be sealed because of the use of assemblies which are not vented. Compensation is made in the present invention for the pressure differential by an automatic disengagement of the lip seal from the first cylindrical surface when a limiting pressure differential value is exceeded. Because of this feature, lubricant in the space to be sealed is not acted upon by the differential pressure, and loss of viscosity from the lubricant or lubricant leakage is reliably prevented, even during longer storage lives.

The sealing ring constitutes a component of a sealing arrangement. The sealing ring, under radial prestressing, surrounding a shaft to be sealed, making a seal, and is enclosed sealingly, and under radial prestressing, by a housing. The sealing ring has an essentially L-shaped stiffening ring made of a tough material, the stiffening ring having an axial projection and a radial projection. The axial projection is essentially completely enclosed by the elastomeric material of the statically sealing first sealing device, and the radial projection is joined to a dynamically sealing second sealing device made of an elastomeric material which is constructed as a lip seal. The first sealing device has at least one grooved duct on the side radially facing away from the second sealing device, which duct basically extends along the entire axial expansion of the radial shaft sealing ring and connects the spaces to be sealed in a flow-conducting manner. The duct is closeable automatically on the side facing away from the space to be sealed—for venting of the space to be sealed —or on the side facing the space to be sealed—for ventilation of the space to be sealed—by a valve lip operable by differential pressure. The valve lip can be forced into statically sealing engagement with the machine part which is adjacent the valve lip in the radial direction.

To achieve manufacture which is simple and cost-effective, the lip seal can be configured integrally and continuously with the retaining ring.

A further simplification can be brought about by constructing the first element, the second element and the lip seal of a uniform material and configuring them integrally and continuously with one another.

Radially on the outside surface, the retaining ring preferably has an undulating surface profile extending in the axial direction. This feature advantageously compensates for tolerances of the first and/or the second machine part contingent upon manufacture and dimensional variations of the space between the two parts. Because the tolerances can be compensated for easily, the entire sealing arrangement may be produced cost-effectively. According to another feature, the sealing lip can be made even in the axial direction with the outer surface of the retaining ring.

Preferably three duct-shaped relief grooves are used which are distributed uniformly in the circumferential direction. It is advantageous that elastic deformation of the lip seal in the radial direction results in a relatively uniform bending load on the lip seal and therefore unwanted partial manifestations of relaxation of the lip seal as well as cants are avoided.

In order to achieve behavior of the lip seal which is as constant as possible during a long service life, the lip seal can have a reinforcement which is completely enclosed by the polymeric material. The tough material of the reinforcement can be formed by a polymeric material, although a metallic material is preferable.

The relief grooves can have an essentially tub-shaped cross-section and a radial depth from 0.02 to 1.0 mm. To provide good working properties over a long service life, it has proven to be advantageous if the ratio of the axial length of each relief groove to its radial depth is 50 to 500. It also is advantageous when the relief grooves have a comparatively small radial depth and because of this, for example, particles floating in the medium to be sealed are reliably kept out of the relief groove. Therefore damage to the lip seal as well as breakdowns in the working properties due to deposits in the area of the lip seal are prevented.

The sealing ring according to the invention is used preferably for the ventilation or venting of a space to be sealed.

DETAILED DESCRIPTION OF THE INVENTION

Figure 1:
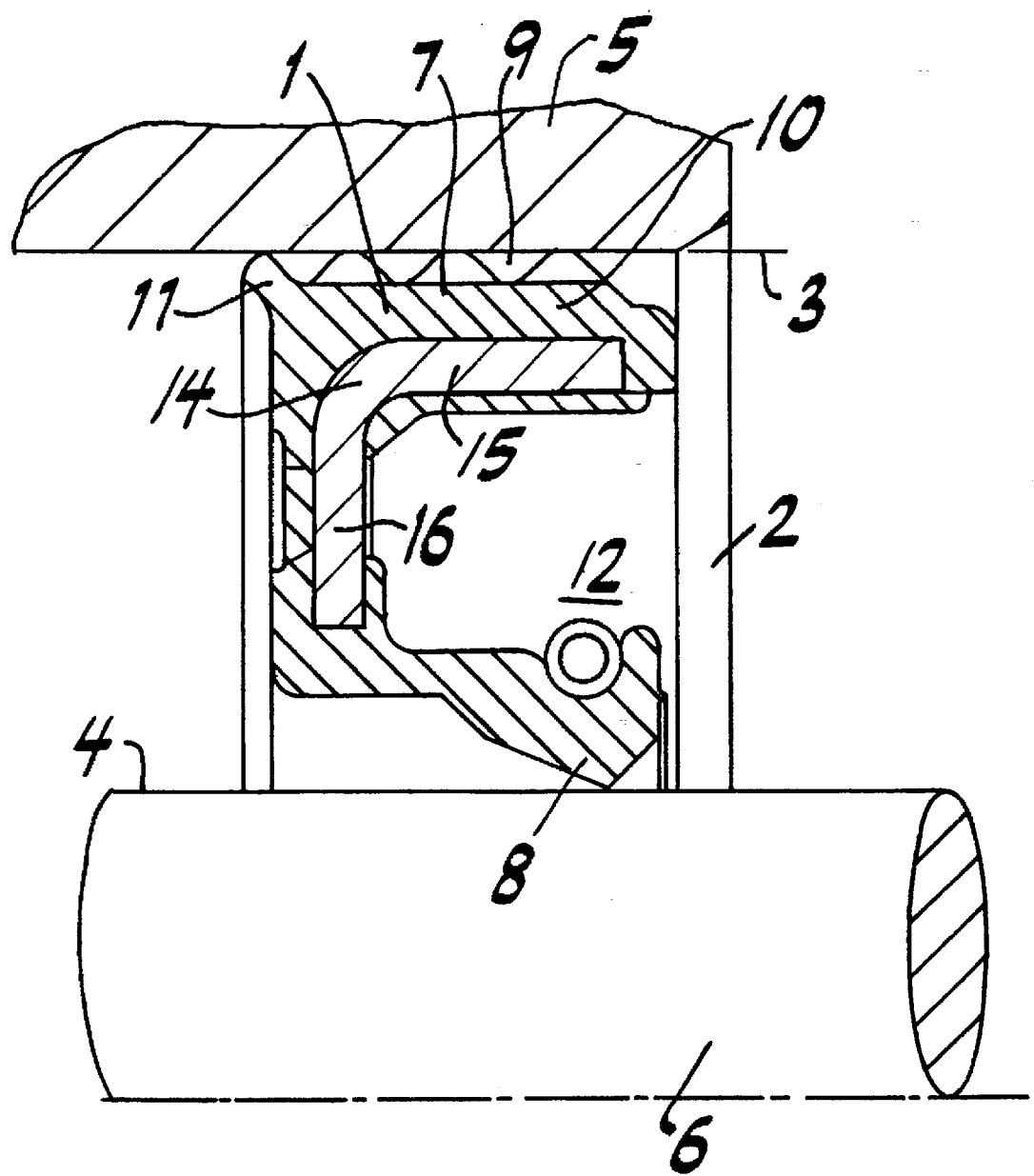
FIG. 1 shows a first exemplary embodiment of the sealing ring according to the present invention which is provided for venting a space to be sealed.

In FIGS. 1 through 4, in each case a sealing arrangement is shown including a sealing ring 1 which, under radial prestressing, contacts a first machine part 5 making a seal with first machine part 5. Sealing ring 1 also seals against, under radial prestressing, a second machine part 6. Sealing ring 1 is contained within a space 2 between machine parts 5, 6. Each of the sealing rings 1 has an essentially L-shaped stiffening ring 14 made of a tough material, preferably a metallic material within a retaining ring 10. The stiffening ring 14 has an axial projection 15 and a radial projection 16, the axial projection 15 being basically completely enclosed by elastomeric material of the statically sealing first sealing device 7. The radial projection 16 is joined to a dynamically sealing second sealing device 8 made of elastomeric material and constructed as a lip seal. On the side facing away from the second sealing device 8, the first sealing device 7 in these exemplary embodiments has three grooved ducts distributed uniformly in the circumferential direction which are designated as relief grooves 9. The relief ducts 9 extend essentially along the entire axial extension of the sealing ring 1 and connect the space 12 to be sealed with the atmosphere. The relief grooves 9 are sealed in the axial direction on one side by a lip seal 11. The relief groove 9 is provided with the lip seal 11 on the side facing away from the space 12 to be sealed to allow venting of the space 12 to be sealed, or on the side facing the space 12 to be sealed for the ventilation of the space 12 to be sealed. The lip seal 11 is operable by differential pressure and is automatically closable. The lip seal 11 is designed to statically seal and is forced into engagement with one of the machine parts 5, 6 which is adjacent in the radial direction.

In FIG. 1, the space 12 to be sealed can be vented as needed. In the embodiment of FIG. 1, the two machine parts 5, 6 are sealed relative to one other. If an excessive pressure differential builds up within the space 12 which exceeds a threshold value used as a basis for the design of sealing ring 1, the lip seal 11 deforms in the radial direction and disengages from the first cylindrical surface 3 of the housing, constructed as the first machine part 5. If pressure equalization is effected and the pressure within the space 12 is sufficient so that the pressure differential is below the threshold value, the lip seal 11 again automatically contacts the first cylindrical surface of the first machine part, because of the internal bias of the lip seal.

Figure 2:
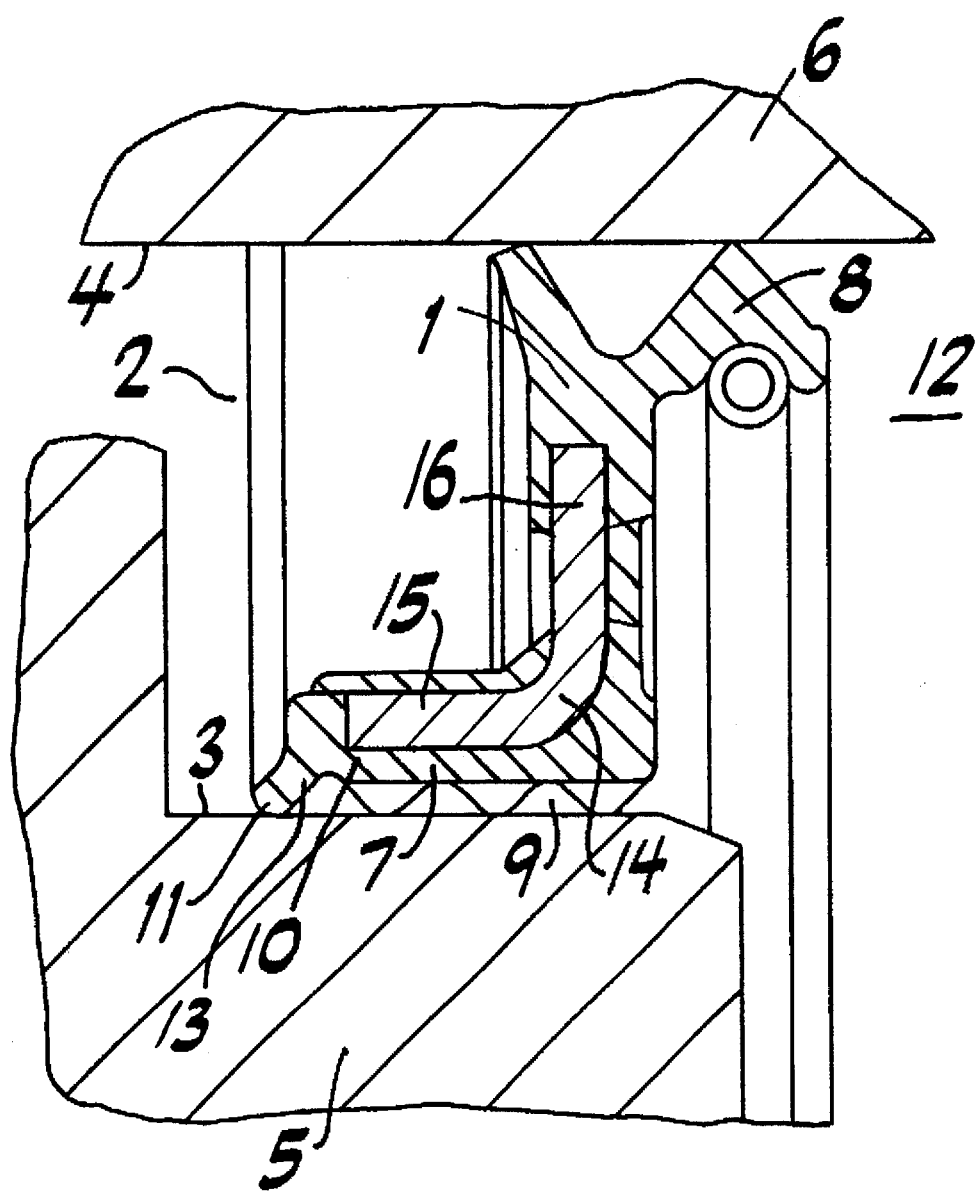
FIG. 2 shows a second exemplary embodiment for venting the space to be sealed.

In FIG. 2 a second exemplary embodiment is shown which is also capable of venting the space 12 to be sealed. In contrast to the exemplary embodiment described in FIG. 1, the first machine part 5 is constructed as an axle and the second machine part 6 is constructed as a housing moving around the first machine part 5. The first sealing device 7 is braced on the first cylindrical surface 3 of the axle, while the second, dynamically stressed sealing device 8 contacts the second cylindrical surface 4 of the second machine part 6, dynamically sealing second machine part 6. Venting of the space to be sealed takes place as described in the exemplary embodiment of FIG. 1.

Figure 3:
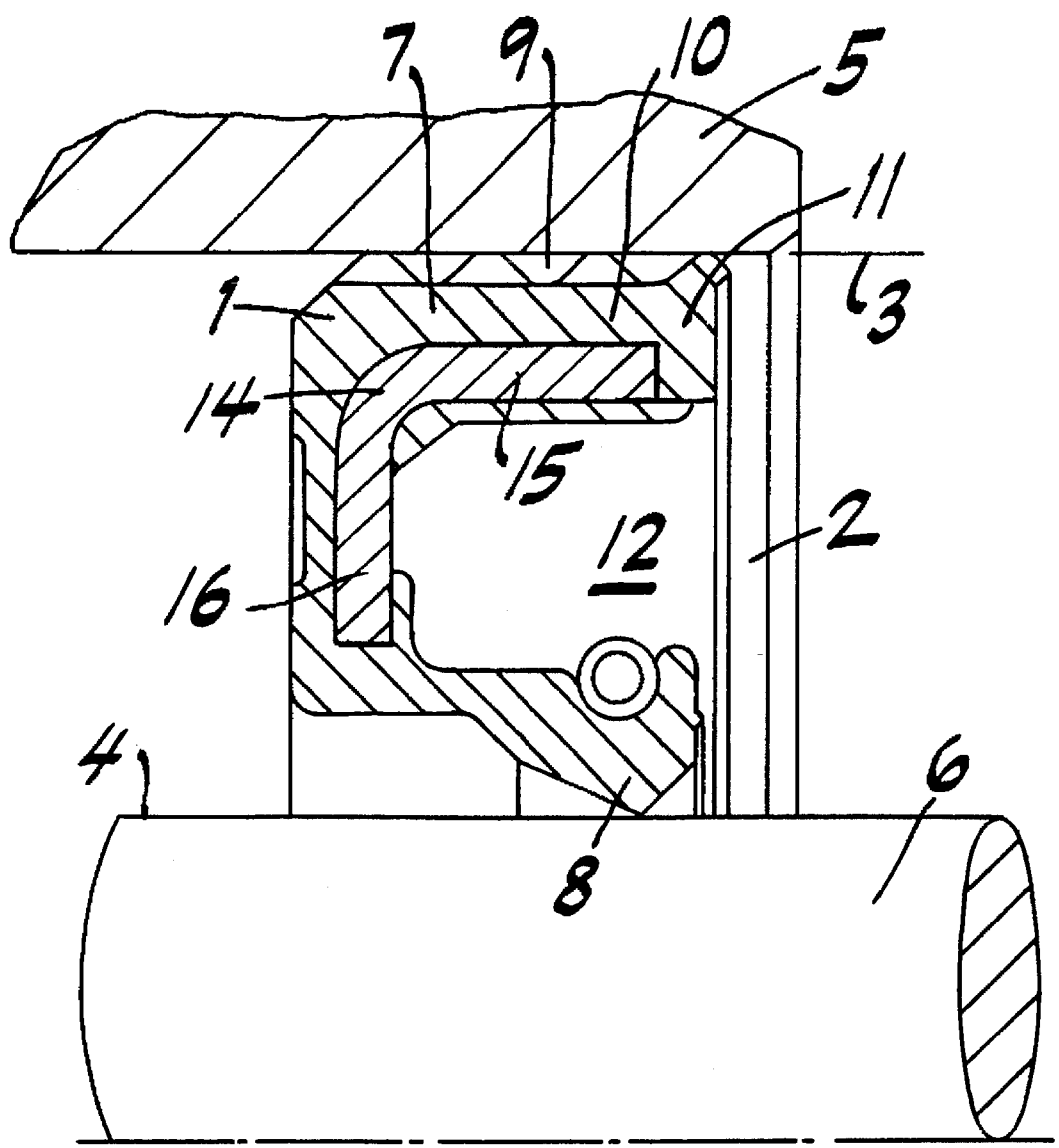
FIG. 3 shows a third exemplary embodiment in which the formation of a vacuum is prevented by ventilating a space to be sealed.

In FIG. 3 a third exemplary embodiment of the sealing ring according to the invention is shown. In the embodiment of FIG. 3 the sealing arrangement is designed in such a way that the space 12 to be sealed can be ventilated as needed. To ventilate the space 12 to be sealed, the lip seal 11 is arranged on the side facing the space 12 to be sealed. The lip seal 11 is braced under radial prestressing against the first cylindrical surface 3 of the first machine part 5 and in the axial direction on one side seals the duct constructed as the relief groove 9.

If an underpressure relative to the surroundings develops within the space 12 which is greater than a pressure differential established as a threshold value, the lip seal 11, subject to the differential pressure, elastically deforms inwardly in the radial direction and a pressure equalization takes place. If subsequently the pressure differential is below the threshold value, the lip seal 11 again automatically contacts the first cylindrical surface 3 of the first machine part 5.

Figure 4:
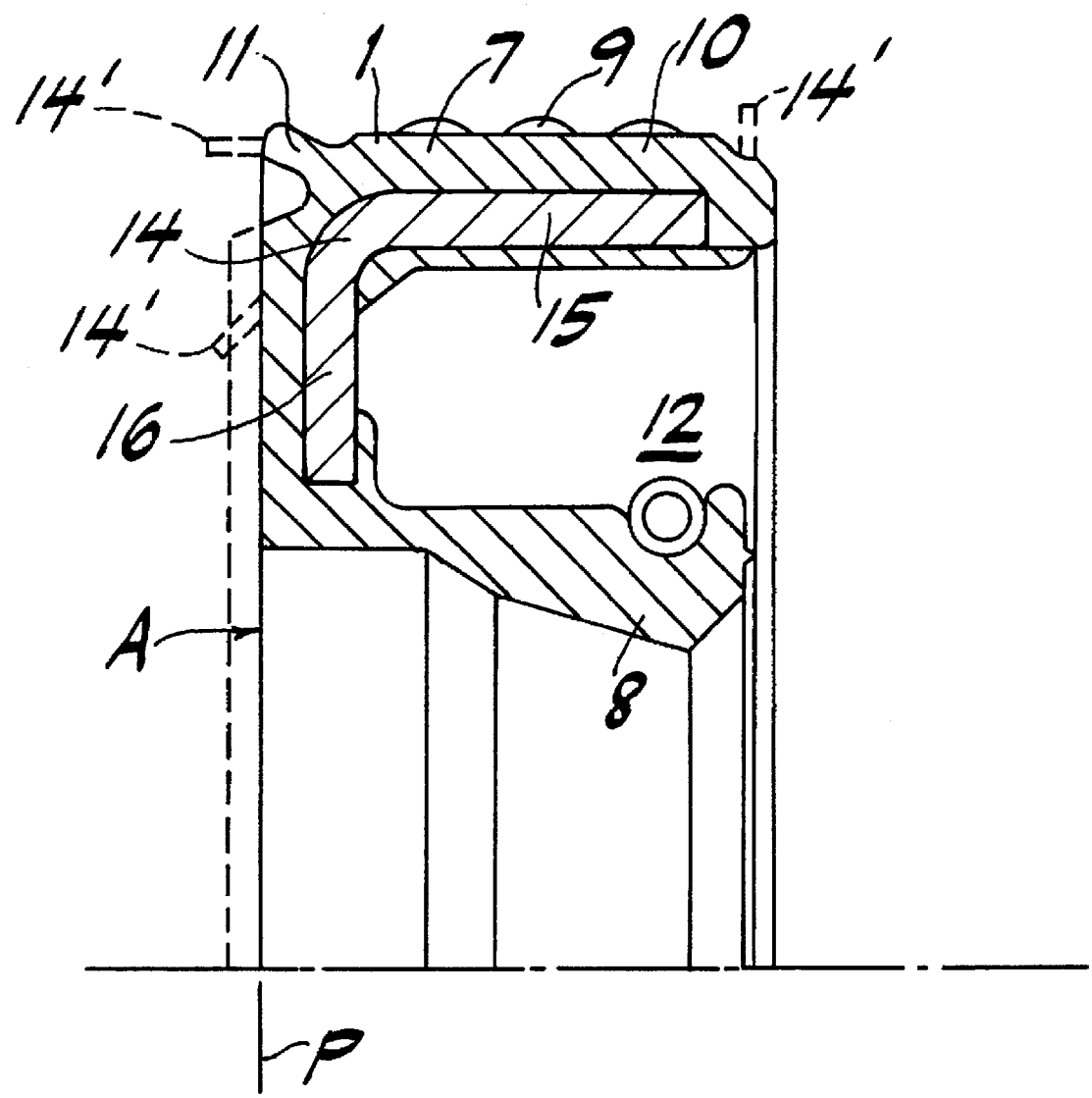
FIG. 4 shows a fourth exemplary embodiment which basically corresponds to the exemplary embodiment of FIG. 1, but which shows alternative locations of the and the lip seal and the end face of the sealing ring being arranged in a radial plane.

In FIG. 4 a fourth exemplary embodiment of the sealing ring according to the present invention is shown, in which the sealing ring corresponds to the sealing ring of FIG. 1. Deviating from the embodiment of FIG. 1, the axial boundary A which forms the end face of the sealing ring is arranged in a radial plane P with the lip seal 11. FIG. 4 also shows various alternative locations 14' of the lip seal 11.

The use of the sealing arrangements in FIGS. 1 through 4 is carried out for the ventilation or venting of spaces to be sealed. In particular in the case of the assembly of gears and axles, pressure frequently builds up within the space to be sealed because of non-vented assemblies. By the use of the sealing arrangement according to the invention the pressure differential is reduced to a value below a threshold value so that, even given long storage time of the aggregates, leakages or loss of oil from the lubricant contingent upon differential pressure are prevented.

While the invention has been described in the specification and illustrated in the drawings with reference to preferred embodiments, it will be understood by those skilled in the art that various changes may be made and equivalents may be substituted for elements of the invention without departing from the scope of the claims.

We claim:

1. A sealing ring insertible into a radial space between two relatively movable cylindrical surfaces of a first and a second machine part, said cylindrical surfaces surrounding one another coaxially, said sealing ring comprising:

a first part statically sealing against said cylindrical surface of said first machine part, said first part fixing said sealing ring to said first machine part, said first part comprising a retaining ring made of an elastomeric material, said retaining ring comprising at least one axial relief groove;

a second part dynamically sealing against said second machine part; and an annular sealing lip seal situated adjacent one end of said relief groove and engageable with said cylindrical surface of said first machine part, said annular lip seal elastically deforming away from said first machine part when acted upon by a pressure differential above a preselected minimum pressure.

2. The sealing ring of claim 1, wherein:

said lip seal is made integrally and continuously with said retaining ring.

3. The sealing ring of claim 1, wherein:

said first and said second parts and said lip seal are constructed of a uniform material and are made integrally and continuously with one another.

4. The sealing ring of claim 1, wherein:

said retaining ring has an undulating surface profile extending in the axial direction on a radially outside surface of said retaining ring.

5. The sealing ring of claim 1, comprising:

three of said duct-shaped relief grooves distributed uniformly in a circumferential direction.

6. The sealing ring of claim 1, further comprising:

a reinforcement completely enclosed by polymeric material.

7. The sealing ring of claim 1, wherein:

said lip seal and an axial boundary of said retaining ring are arranged in a radial plane.

8. The sealing ring of claim 1, wherein:

said relief groove comprises an essentially tub-shaped cross-section and has a radial depth from to 0.02 to 0.1 mm.

9. The sealing ring of claim 1, wherein:

a ratio of an axial length of said relief groove to a radial depth of said relief groove is 50 to 500.

* * * * *

UNITED STATES PATENT AND TRADEMARK OFFICE
CERTIFICATE OF CORRECTION

PATENT No. : 5,642,889

DATED : July 1, 1997

INVENTOR(S): PAULER, et al.

It is certified that error appears in the above-identified patent and that said Letters Patent is hereby corrected as shown below:

In Claim 8, column 6, line 15, change "0.1" to -- 1.0 --.

Signed and Sealed this

Sixth Day of January, 1998

Attest:

BRUCE LEHMAN

*Attesting Officer*    *Commissioner of Patents and Trademarks*